3,097,115
CATALYSTS AND ELECTRODES FOR FUEL CELLS
Anthony M. Moos, Ossining, N.Y., assignor to Leesona Corporation, Cranston, R.I., a corporation of Massachusetts
No Drawing. Filed Aug. 1, 1960, Ser. No. 46,380
9 Claims. (Cl. 136—120)

This invention relates to improved fuel cell electrodes and to their method of manufacture. More particularly the invention relates to electrodes prepared from natural and synthetic zeolites, possessing a high degree of catalytic activity and amenable to fabrication of a variety of fuel cell electrode structures.

"Fuel cell," as used in this specification is the common name applied to an electrochemical cell capable of generating electrical energy through electrochemical combustion of a fuel gas with an oxygen containing gas. Such cells are not novel and have been fully described in the literature. Their precise construction and operation does not form a part of the instant invention except in an incidental capacity. However, a brief description of the nature and construction of a fuel cell is helpful if not essential in understanding the function and importance of the instant invention.

In general the simplest fuel cell comprises a housing, two electrodes and an electrolyte which acts as an oxygen transferring medium. An oxidizing gas such as air under super-atmospheric pressures is circulated on one side of the oxidizing electrode and a fuel gas such as hydrogen under super-atmospheric pressure is circulated on one side of the other electrode. A three phase interface exists at each electrode, i.e., gas, electrolyte, and solid where a process of adsorption and de-adsorption occurs generating an electrochemical force. When current is drained from the two electrodes there is a net flow of electrons from the fuel gas side through an external electrical circuit to the oxidizing gas side. Thus, according to the external electron flow convention, the oxidizing gas electrode is the positive electrode and the fuel gas electrode the negative electrode. Oxygen is consumed at the positive electrode surface and fuel gas is oxidized into products of combustion at the negative electrode surface. The result is accompanied by release of a portion of the energy of combustion as electrical energy while the remainder is released as heat.

Recently the fuel cell has become the center of considerable activity spurred by such developments as the bi-porous electrode which provides greater efficiency in the operation of the cell and also through improved design of mechanical aspects of cells. However even with the modern developments which have made the fuel cell commercially attractive it is still capable of substantial improvements and thus is the object of considerable research. A particular aim of such research is the development of an efficient, electrochemically stable electrode, capable of operating at both high and low temperatures and utilizing solid as well as fused and liquid electrolytes. The instant invention now provides an improved electrode, economically produced, which solves or materially minimizes a number of problems prevalent in fuel cell construction.

Thus it is an object of the invention to provide an improved fuel cell electrode possessing a highly activated surface.

It is another object to provide an electrode having a high degree of electrochemical stability.

It is another object to provide a bi-porous electrode containing an activated surface and which is economical to produce.

It is still another object of this invention to provide a method of making an improved electrode.

These and other objects of the invention will appear from the following detailed description with particular reference to the specific illustrative examples.

According to the instant invention the improved electrodes are made from natural and synthetic zeolites. As used hereinafter in the specification and claims, "zeolite" will include both the natural and synthetic materials. The natural zeolites are hydrous silicates of aluminum, which ordinarily contain sodium or calcium, having ion exchange properties, large surface areas and a homogenous and finite porosity. Synthetic zeolites are now available from a number of manufacturers including Linde Air Reduction Co., a division of Union Carbide. The synthetic zeolites are highly porous materials and in contrast to other adsorbents have pores which are of molecular dimensions and uniform size. These synthetic zeolites are described in The Journal of the American Chemical Society, 78,5963 (1956) in an article entitled Crystalline Zeolites.

The sodium, calcium and lithium ions present in natural and synthetic zeolites can be replaced by other metallic ions by ion exchange processes. These ion exchanged zeolites have catalytic properties dependent upon the extent of replacement and the nature of the replacement ion used. As an example, by exchanging the naturally occurring ion with a metal belonging to periodic group 8, hydrogentation or reforming catalysts can be obtained. An oxidation catalyst in turn can be obtained by the replacement of sodium, calcium, or lithium with a metal ion such as copper or silver. However, it was found that ion exchanged zeolites, when in contact with electrolytic solutions, tend to cross exchange the catalytic ion with an ion present in the electroyltic solution. Therefore, the zeolites were not satisfactory for use in fuel cell electrodes.

Now I have discovered that the ion exchange properties of these catalyzed zeolites can be destroyed without appreciably affecting their catalytic properties, porosity, and pore size distribution by heating at temperatures in excess of 600° C., preferably in the range of 600–1600° C. The natural and synthetic zeolites wherein the normally occurring ions have been exchanged with an active metallic ion and whose ion exchange properties have been destroyed are suitable materials for use in fuel cell electrodes. These materials are not only active and show suitable electronic conductivity but are amenable to fabrication of a variety of electrodes and electrode structures.

Suitable electrodes have been made according to this invention for use in fuel cells operating in temperatures in the range of from 20–850° C. As is apparent, it is therefore possible to use such electrodes with liquid, fused or solid electrolytes. Further it is possible to prepare an electrode suitable for use at the fuel gas side or at the oxidizing gas side depending upon the selection of the metallic ion used to exchange with the naturally occurring ion of the zeolite. For example, it is possible to activate the zeolites with nickel, which electrodes, after having the ion exchange properties destroyed by heating in excess of 600° C. can be used as either the anode or cathode. Silver activated zeolites can be used conveniently as the oxidizing electrode. Zeolites activated with platinum, palladium, or rhodium can likewise be used as fuel electrodes. Zeolites activated with copper, nickel, cobalt or manganese and heated at temperatures in excess of 350° C. in an oxidizing atmosphere followed by further heating in the presence of a lithium salt to interstitially introduced lithium atoms in the oxide lattice, can be used as oxygen or air electrodes. Electrodes combining one or more catalysts, promotors or activators can also be prepared by mixing catalytically activated zeolites of the type described above in suitable proportions.

In the process of preparing electrodes the ions of natural or synthetic zeolites are exchanged with catalytic ions by known ion exchange techniques. One illustrative method is to heat the zeolite in a solution of the catalytic ion. Time and temperature of the exchange step are to a large extent relative and thus not critical. As is well known, increase of temperature almost invariably increases the rate of a chemical reaction to a marked extent. For homogeneous processes the specific rate is usually increased by a factor of about 2 or 3 for every 10° rise of temperature. Although the instant invention possibly may not involve a true chemical reaction a corollary can still be drawn. It is axiomatic that the greater the concentration of a solution the greater the amount of material which will be exchanged for a given time and temperature.

After the naturally occurring ions of the zeolite have been exchanged with the catalytic ions and stabilized by heating, an electrode structure such as an electrolyte impregnated ceramic plate or cylinder can be sprayed or painted either in the form of very fine powders, in some cases approaching molecular dimensions, or in the form of powders having dimensions falling within definite and limited ranges (10–50μ diameter). In some cases when using porous matrices impregnated with molten electrolytes it is desirable that the average pore size of the electrode be larger than the average pore size of the porous ceramic matrix holding the electrolyte. Particles of the catalytically activated zeolites having finite dimensions can be readily obtained by mixing a small proportion of a binding agent such as fire clay or bentonite with the catalytically activated materials, and thereafter wetting, granulating, drying and sieving. The thickness of the activated coating is not critical as long as a continuous film is formed. However usually the film is from about .1 mm. to 2 mm. thick. These electrodes are particularly suited for operation in fuel cells at temperatures of from about 100–700° C.

Another process of making electrodes from activated zeolites is to admix a powdered zeolite in the presence of water with a ceramic binding agent such as bentonite or fire clay. The admixture is then shaped as an electrode and fired at an elevated temperature for a suitable period of time, preferably in a vacuum oven. The naturally occurring ions of the zeolite are exchanged after the firing by immersing the shaped structure in a solution of the catalytic ion. The electrode is then heated to stabilize the activated structure. Such electrodes have a high degree of porosity, large internal surface area and possess good catalytic properties. These electrodes are particularly suited for operation in fuel cells at temperatures of from about 20–100° C.

Dual porosity electrodes are readily prepared using catalytically activated zeolites by compacting and sintering the material in a reducing atmosphere at temperatures ranging from 600–1600° C. Activated and stabilized zeolites having a particle size ranging from 10–50 microns can be employed with or without the use of a spacing agent. The spacing agent, if used, can be any material compatible with the zeolite which is capable of releasing carbon dioxide, nitrogen or some other inert gas. An example of one such spacing agent is ammonium bicarbonate. By varying the sintering conditions, the quantity of spacing agent and compacting pressures, structures having diverse porosities and pore sizes can be obtained. To obtain a bi-porous structure a fine pore layer can be formed on one of the surfaces of the porous material by layering, compacting and sintering in a reducing atmosphere at temperatures ranging from 600–1600° C. with the same or a different activated and stabilized zeolite powder having a particle size ranging from 0.5–10 microns. If desirable the electrodes thus formed can be activated by vacuum impregnation with an aqueous solution of nickel, cobalt, platinum, palladium or rhodium salts followed by reduction of the salt to the metallic state. Reduction of the salt to the activating metal is achieved either by using a reducing atmosphere (hydrogen) or an aqueous solution of a reducing agent.

The dual porosity electrodes are particularly suited for use with concentrated aqueous electrolyte solutions of sodium hydroxide-lithium hydroxide eutectic, or of the sodium hydroxide-potassium hydroxide-lithium hydroxide eutectic. Fuel cells utilizing this type of electrolyte usually are operated at temperatures of from about 100° C. to 450° C.

The following examples are set forth to more particularly illustrate the invention, however, they are not meant to be limiting. Parts refer to parts by weight unless otherwise specified.

Examples 1–3 teach the preparation of electrodes particularly suitable for use in fuel cells operating in the temperature range of 20–100° C. Example 4 describes the preparation of an electrode particularly suitable for fuel cells which operate at temperatures in the range of from 100–450° C. and use as the electrolyte, concentrated aqueous alkaline eutectic mixtures. Example 5 describes an electrode particularly suited for use in fuel cells operating at temperatures in excess of 450° C. As will be apparent from the examples the electrode can be used either on the oxidizing gas side of the cell or on the fuel gas side depending upon the activating ions used in forming the ion-exchanged zeolites.

*Example 1*

95 parts of a type 13A powdered synthetic zeolite manufactured by Linde Air Products Co., a division of Union Carbide, was admixed in the presence of 20 parts of water with 5 parts of bentonite, a ceramic binding agent. The admixture was shaped as a cylinder and dried at a temperature of 550° C. for a period of 1¾ hours in a vacuum oven. After the firing, the calcium, lithium and sodium ions present in the structure were interchanged with silver ions by ion exchange with a 20% aqueous solution of silver nitrate. The activated structure thus obtained was heated at a temperature of 750° C. for 110 minutes to stabilize the catalytic structure.

The electrode had a high degree of porosity, a large internal surface area, and possessed good catalytic properties. The electrode was used in a fuel cell, on the oxidizing gas side, utilizing a 28% sodium hydroxide electrolyte and operated at temperatures in the range of from 60–100° C.

*Example 2*

85 parts of a type A13 synthetic zeolite manufactured by Linde Air Products Co., a division of Union Carbide, was admixed in the presence of 15 parts of water and 8 parts of fire clay, a ceramic binding agent. The admixture was shaped as a flat plate, dried and fired at a temperature of 480° C. for a period of 2½ hours in a vacuum oven. After the firing the calcium ions present in the structure were interchanged with nickel ions by ion exchange with a 10% aqueous solution of nickel chloride. The activated electrode structure thus obtained was heated at a temperature of 1200° C. for a period of 50 minutes to stabilize the catalytic structure.

The electrode had a high degree of porosity, large internal surface area and possessed good catalytic properties. The electrode was used in a fuel cell on the fuel gas side utilizing a 28% potassium hydroxide electrolyte and operated at a temperature of from 25–55° C. with good results. The fuel cell had an efficiency in excess of 50%.

*Example 3*

100 parts of a naturally occurring zeolite marketed by The American Zeolite Company and containing a mixture of sodium, calcium and lithium ions were admixed in the presence of 25 parts of water with 10 parts of bentonite, a ceramic binding agent. The admixture was shaped as a cylinder and fired at a temperature of 550° C. for a period of 2½ hours in a vacuum oven. After the firing the natural occurring ions present in the structure were interchanged with palladium ions by ion exchange with a 2% aqueous solution of palladium nitrate. The ion exchange process was accomplished at a temperature of 65° C. by immersing the fired structure in the solution of palladium nitrate for a period of 1½ hours. The activated structure thus obtained was heated at a temperature of 600° C. for 140 minutes to stabilize the catalytic structure.

The electrode possessed good catalytic properties, had a high internal surface area and a high degree of porosity. The electrode was tested in a fuel cell on the fuel gas side utilizing a 28% sodium hydroxide electrolyte and operated at a temperature in the range of 50–75° C.

*Example 4*

80 parts of a naturally occurring zeolite marketed by the American Zeolite Co., ground to a particle size of from 10–50 microns was immersed in distilled water for 48 hours to permit easy exchange of the ions. The resin in the swelled condition was contacted with a salt solution of 40 grams of nickel chloride made up to 1000 grams with distilled water. The zeolite was contacted with the salt solution for a period of 72 hours filtered and dried in an air oven for 24 hours at 80° C. The nickel activated zeolite was heated at 800° C. for 1¾ hours to stabilize the catalytic structure. The activated and stabilized zeolite, totaling 70 parts, was admixed with 5 parts of ammonium bicarbonate spacing agent and compacted as a plate with 7 parts of a viscous phenol-formaldehyde resin and sintered at 800° C. for 80 minutes.

A fine pore layer was formed on one surface of the above plate by compacting 40 parts of a similarly activated type 13A powdered synthetic zeolite marketed by Linde Co., described hereinbefore, and having molecular dimensions with 5 parts coal tar pitch in a 50% solution of methyl ethyl ketone. The material was sintered in a reducing oven at 700° C. for 50 minutes. The resultant electrode was activated by vacuum impregnation with an aqueous solution of nickel chloride followed by drying of the electrode and reduction of the salt to the metallic state by heating in a vacuum oven heated to 400° C. in an atmosphere of forming gas (10% hydrogen and 90% nitrogen). The resultant activated electrode was tested in a fuel cell on the fuel gas side and found to possess excellent electrochemical performance characteristics. The electrode was found to exhibit excellent electrochemical stability in a cell utilizing fused sodium hydroxide-potassium hydroxide eutectic electrolyte.

*Example 5*

95 parts of a type 13A synthetic zeolite manufactured by the Linde Air Products Co., a division of Union Carbide, was immersed in a saturated solution of silver acetate in water. The immersion was maintained for a period of 6½ hours at a temperature of 80° C. The activated ion exchanged synthetic zeolite thus obtained was heated at a temperature of 700° C. for 45 minutes to stabilize the ions.

A ceramic disc was then sprayed with an 85% aqueous solution of the silver activated zeolite, using the flame spraying technique, to obtain a continuous film of approximately .5 mm. thickness on the disc. The disc was found upon testing to have excellent electrochemical performance characteristics. When used as the oxidizing electrode in a fuel cell operating at a temperature of from 450–500° C. and with an impregnated magnesia matrix as a holder for the fused salt electrolyte the cell was found to possess an outstanding degree of electrochemical stability.

In Examples 1–5 activating metallic ions other than those set forth in the examples can be used to replace the natural occurring ions in the zeolites. It is possible to employ any ions which will displace the naturally occurring ions including copper, cobalt, magnesium, platinum, palladium, rhodium, iridium and gold. The invention is not to be construed as limited by the illustrative examples. It is possible to produce still other embodiments without departing from the inventive concept herein disclosed, such embodiments being within the ability of one skilled in the art.

It is claimed and desired to secure by Letters Patent:

1. An electrode for a fuel cell having a metal catalyst bonded therein, comprising a catalytic metal containing, heat stabilized ion-exchanged zeolite, said heat stabilizing occurring at a temperature of from about 600–1600° C.

2. The electrode of claim 1 wherein the electrode is bi-porous.

3. An electrode for a fuel cell having a catalytically activating metal bonded therein comprising a heat stabilized, metal catalyzed, ion-exchanged zeolite, said electrode formation comprising ion exchanging the naturally occurring ions of the zeolite with an activating metallic ion, and heat stabilizing the ion-exchanged zeolite by heating in the temperature range of from 600–1600° C.

4. The method of making a fuel cell electrode having a catalytically activating metal bonded therein comprising the steps of (1) admixing a zeolite with a ceramic binding agent, (2) shaping the admixture to form an electrode, (3) firing said electrode at an elevated temperature, sufficient to produce a stable structure, (4) ion exchanging the naturally occurring ions from said zeolite with an activating metallic ion, and (5) heat stabilizing said electrode by heating in the temperature range of from 600–1600° C.

5. The electrode made by the process of claim 4.

6. The method of making a fuel cell electrode having a metal catalyst bonded therein, comprising coating a ceramic structure with a film of from about 0.1 mm. to 2 mm. thickness with a catalytic metal containing, heat stabilized ion-exchanged zeolite, said heat stabilizing occurring at a temperature of from about 600–1600° C.

7. The electrode made by the process of claim 6.

8. he method of making a bi-porous fuel cell electrode having a catalytically activating metal bonded therein comprising ion exchanging the naturally occurring ions of a zeolite having a particle size of from 10–50 microns with an activating metallic ion, compacting said zeolite, heat stabilizing said zeolite by heating in the temperature range of 600–1600° C., superimposing upon said structure a metallic ion activated zeolite having a pore size of from 0.5 to 10 microns, compacting and heat stabilizing at a temperature of from about 600–1600° C.

9. The electrode made by the process of claim 8.

References Cited in the file of this patent

UNITED STATES PATENTS

| | | |
|---|---|---|
| 1,907,821 | Jaeger | May 9, 1933 |
| 2,616,847 | Ginell | Nov. 4, 1952 |
| 2,914,596 | Gorin et al. | Nov. 24, 1959 |